(12) United States Patent
Zhu et al.

(10) Patent No.: US 9,954,226 B2
(45) Date of Patent: Apr. 24, 2018

(54) PRECURSORS FOR LITHIUM TRANSITION METAL OXIDE CATHODE MATERIALS FOR RECHARGEABLE BATTERIES

(71) Applicants: Umicore, Brussels (BE); Umicore Korea Ltd., Chungnam (KR)

(72) Inventors: Liang Zhu, Cheonan (KR); Randy DePalma, Seoul (KR); Hyo Sun Ahn, Cheonan (KR)

(73) Assignees: Umicore, Brussels (BE); Umicore Korea Ltd., Chungnam (KR)

( * ) Notice: Subject to any disclaimer, the term of this patent is extended or adjusted under 35 U.S.C. 154(b) by 0 days.

(21) Appl. No.: 15/317,162

(22) PCT Filed: May 29, 2015

(86) PCT No.: PCT/IB2015/054062
§ 371 (c)(1),
(2) Date: Dec. 8, 2016

(87) PCT Pub. No.: WO2015/189737
PCT Pub. Date: Dec. 17, 2015

(65) Prior Publication Data
US 2017/0133675 A1   May 11, 2017

(30) Foreign Application Priority Data

Jun. 12, 2014  (EP) .................................. 14172071
Feb. 16, 2015  (EP) .................................. 15155172

(51) Int. Cl.
| | | |
|---|---|---|
| H01B 1/08 | (2006.01) | |
| H01M 4/505 | (2010.01) | |
| H01M 4/525 | (2010.01) | |
| H01M 10/0525 | (2010.01) | |
| C01G 53/00 | (2006.01) | |
| H01M 4/02 | (2006.01) | |

(52) U.S. Cl.
CPC ............ *H01M 4/505* (2013.01); *C01G 53/44* (2013.01); *H01B 1/08* (2013.01); *H01M 4/525* (2013.01); *H01M 10/0525* (2013.01); *C01P 2004/51* (2013.01); *C01P 2006/11* (2013.01); *C01P 2006/12* (2013.01); *C01P 2006/40* (2013.01); *H01M 2004/028* (2013.01)

(58) Field of Classification Search
CPC .. H01B 1/00; H01B 1/06; H01B 1/08; H01M 4/505; H01M 4/525
See application file for complete search history.

(56) References Cited

U.S. PATENT DOCUMENTS

| | | | |
|---|---|---|---|
| 7,384,706 B2 | 6/2008 | Suhara et al. | |
| 7,585,435 B2 | 9/2009 | Ito et al. | |
| 8,268,198 B2 | 9/2012 | Shin et al. | |
| 8,592,085 B2 | 11/2013 | Kobino | |
| 2006/0083989 A1 | 4/2006 | Suhara | |
| 2009/0146115 A1 | 6/2009 | Xiao et al. | |
| 2010/0310869 A1 | 12/2010 | Jahn et al. | |
| 2012/0134914 A1* | 5/2012 | Paulsen .................. | H01L 31/08 423/594.15 |

FOREIGN PATENT DOCUMENTS

| | | |
|---|---|---|
| CN | 102574700 A | 7/2012 |
| CN | 103797623 A | 5/2014 |
| DE | 10-2007-049108 | 4/2009 |
| JP | 2010-192424 | 9/2010 |
| JP | 2011-057518 | 3/2011 |
| JP | 2013-235786 | 11/2013 |
| KR | 20090092729 A * | 9/2009 |
| TW | 201351760 A | 12/2013 |

OTHER PUBLICATIONS

English language translation of DE102007049108 (pub 2009) (Year: 2009).*
English language translation of CN102574700 (pub 2012) (Year: 2012).*
European Search Report for EP 14 17 2071, dated Nov. 21, 2014.
Taiwan IPO Search Report for 104115591, dated Jan. 12, 2016.
International Search Report for PCT/IB2015/054062, dated Aug. 28, 2015.
Lu et al., "Layered Li[NixCo1-2xMnx]O2 Cathode Materials for Lithium Ion Batteries", Electrochemical and Solid-State Letters, vol. 4, No. 12 (2001), pp. A200-A203.

* cited by examiner

*Primary Examiner* — Mark Kopec
(74) *Attorney, Agent, or Firm* — Brinks Gilson & Lione

(57) ABSTRACT

A particulate precursor compound for manufacturing a lithium transition metal (M)-oxide powder usable as an active positive electrode material in lithium-ion batteries, wherein (M) is $Ni_xMn_yCo_zA_v$, A being a dopant, wherein $0.33 \leq x \leq 0.60$, $0.20 \leq y \leq 0.33$, and $0.20 \leq z \leq 0.33$, $v \leq 0.05$, and $x+y+z+v=1$, the precursor having a specific surface area PBET in $m^2/g$, a tapped density PTD in $g/cm^3$, a median particle size PD50 in µm, and wherein (I).

$$\frac{PBET}{PTD * PD50} \geq \frac{0.021}{(0.1566 * x) - 0.0466} \quad (I)$$

4 Claims, No Drawings

PRECURSORS FOR LITHIUM TRANSITION METAL OXIDE CATHODE MATERIALS FOR RECHARGEABLE BATTERIES

This application is a National Stage application of International Application No. PCT/IB2015/054062, filed May 29, 2015. This application also claims priority under 35 U.S.C. § 119 to European Application No. 14172071.4, filed Jun. 12, 2014 and European Application No. 15155172.8, filed Feb. 16, 2015.

TECHNICAL FIELD AND BACKGROUND

The invention is related to particulate precursor compounds for manufacturing a lithium transition metal (M)-oxide powder usable as an active positive electrode material in lithium-ion batteries. More in particular, the precursors may be hydroxide or oxyhydroxide compounds having physical characteristics such as tapped density, specific surface area and median particle size that are related by a mathematical formula to the Ni content of the precursor.

Due to their high energy density, rechargeable lithium and lithium-ion batteries can be used in a variety of portable electronics applications, such as cellular phones, laptop computers, digital cameras and video cameras.

Commercially available lithium-ion batteries typically consist of graphite-based anode and $LiCoO_2$-based cathode materials. However, $LiCoO_2$-based cathode materials are expensive and typically have a relatively low capacity of approximately 150 mAh/g.

Alternatives to $LiCoO_2$-based cathode materials include LNMCO type cathode materials. LNMCO means lithium-nickel-manganese-cobalt-oxides. The composition is LiMO2 or $Li_{1+x}M_{1-x}O_2$ where M=$Ni_xCo_yMn_zA_m$ (which is more generally referred to as "NMC", A being one or more dopants). LNMCO has a similar layered crystal structure as $LiCoO_2$ (space group r-3m). The advantage of LNMCO cathodes is the much lower raw material price of the composition M versus pure Co. The addition of Ni gives an increase in discharge capacity, but is limited by a decreasing thermal stability with increasing Ni content. In order to compensate for this problem, Mn is added as a structural stabilizing element, but at the same time some capacity is lost. Typical cathode materials include compositions having a formula $Li_{1+x}(Ni_{0.51}Mn_{0.29}Co_{0.20})_{1-x}O_2$ (for example x=0.00-0.03, referred to as NMC532), $Li_{1+x}(Ni_{0.38}Mn_{0.29}Co_{0.33})_{1-x}O_2$ (for example x=0.08-0.10, referred to as NMC433), $Li_{1+x}(Ni_{0.6}Mn_{0.2}Co_{0.2})_{1-x}O_2$ (X=0.02-0.04, referred to as NMC622) or $Li_{1+x}(Ni_{0.35}Mn_{0.32}Co_{0.33})_{1-x}O_2$ (for example x=0.06-0.08, referred to as NMC111). The target lithium-containing composite oxide is generally synthesized by mixing a nickel-cobalt-manganese composite (oxy-)hydroxide as a precursor material (having the same metal composition as the final cathode material will have) with a lithium compound and fired, and the cell characteristics can be improved by substituting a part of nickel, cobalt and manganese by other metal elements. As other metal elements, Al, Mg, Zr, Ti, Sn and Fe are exemplified. The suitable substituting quantity is 0.1 to 10% of the total quantity of the nickel, cobalt and manganese atoms.

Generally, for the production of cathode materials with complex compositions, special precursors such as mixed transition metal hydroxides are used. The reason is that high performance $Li-M-O_2$ needs well mixed transition metal cations. To achieve this without "oversintering" (high temperature sintering for a longer period together with a lithium precursor, typically $Li_2CO_3$ or LiOH) the cathode precursors need to contain the transition metal in a well-mixed form (at atomic level) as provided in mixed transition metal hydroxides, carbonates etc. Mixed hydroxides or carbonates are typically prepared by precipitation reactions. Precipitation of mixed hydroxides (for example, the precipitation of a flow of NaOH with a flow of $M-SO_4$ under controlled pH) or mixed carbonates (for example, the precipitation of a flow of $Na_2CO_3$ with a flow of $M-SO_4$) allows precursors of suitable morphology to be achieved.

According to U.S. Pat. No. 7,384,706 for example there are provided nickel-cobalt-manganese composite oxyhydroxide particles, formed by precipitating a nickel-cobalt-manganese composite hydroxide. For the precipitation, an aqueous solution of a nickel-cobalt-manganese salt, an aqueous solution of an alkali-metal hydroxide and an ammonium-ion donor are continuously or intermittently supplied to a reaction system, at a temperature between 30 and 70° C., and maintaining the pH at a substantially constant value within a range between 10 and 13; and making an oxidant act on the composite hydroxide. The obtained precursors typically have a median particle size D50 of 3 to 15 µm, a pressed density of more than 2 $g/cm^3$ and a specific surface area (BET value) of 4 to 30 $m^2/g$. From this patent, and also from U.S. Pat. No. 7,585,435, aiming at supplying high density cobalt-manganese co-precipitated nickel hydroxide, it can be understood that the processes for manufacturing transition metal (oxy-)hydroxide precursors are relatively versatile and capable of providing specific values for physical characteristics such as specific surface area (BET), tap density and particle size distribution, by fine-tuning the precipitation processes.

For characterizing a secondary lithium cell one of the most important parameters besides the discharge capacity is the irreversible capacity, which is responsible for the fading of the capacity during cycling. Lithium-excess layered transition metal oxides $Li_{1+x}M_{1-x}O_2$ often have a huge irreversible capacity loss associated with the oxygen and lithium loss from the host structure of the layered oxide at the end of the first charging process. Although the irreversible capacity loss can be significantly reduced by coating with insulating materials (e.g., $Al_2O_3$ or MgO), the high surface area associated with the nanostructured lithium layered oxides could have such a high surface reactivity to induce side reactions between the electrodes and the electrolyte. This could lead to destabilization of the active materials and an increase in impeding passivation. Therefore, the electrolyte safety is of major concern, and ways have to be found to eliminate the side reactions and lower the irreversible capacity $Q_{irr}$. As described by Lu and Dahn in "Layered $Li[Ni_xCo_{1-2x}Mn_x]O_2$ Cathode Materials for Lithium-Ion Batteries", *Electrochemical and Solid-State Letters*, 4 (12) A200-A203 (2001), for x=¼ and ⅜, when cycling between 2.5 and 4.4 V at a current of 40 mA/g, an irreversible capacity loss of 12% is quite acceptable.

In patents such as U.S. Pat. No. 8,268,198 the relationship between the chemical composition of the precursor compound (i.e. the sulfate content) and the irreversible capacity of the lithium transition metal oxide cathode material has been established. A direct relationship between the physical characteristics of the precursor and the irreversible capacity of the lithium transition metal oxide cathode material, wherein also the Ni content of the material is taken into account, has not yet been provided.

The present invention aims to provide improved precursors of lithium transition metal cathode materials for positive electrodes having an intermediate to high Ni content, made by a cheap process, and having a reduced irreversible capacity $Q_{irr}$ upon cycling in the secondary battery.

SUMMARY

Viewed from a first aspect, the invention can provide a particulate precursor compound for manufacturing a lithium transition metal (M)-oxide powder usable as an active positive electrode material in lithium-ion batteries, wherein (M) is $Ni_xMn_yCo_zA_v$, A being a dopant, wherein $0.33 \leq x \leq 0.60$, $0.20 \leq y \leq 0.33$, and $0.20 \leq z \leq 0.33$, $v \leq 0.05$, and $x+y+z+v=1$, the precursor having a specific surface area PBET in $m^2/g$, a tapped density PTD in $g/cm^3$, a median particle size PD50 in μm, and wherein $$\frac{PBET}{PTD * PD50} \geq \frac{0.021}{(0.1566 * x) - 0.0466} (1).$$

In one embodiment, $$\frac{PBET}{PTD * PD50} \geq \frac{0.041}{(0.1566 * x) - 0.0466} (2).$$

The Ni content x of the precursor is identical to the Ni content of the lithium transition metal (M)-oxide powder. The tap or tapped density is measured according to ASTM B527. The precursor compound may have a composition wherein $v=0$, $0.33 \leq x \leq 0.60$, $0.20 \leq y \leq 0.33$, and $0.20 \leq z \leq 0.33$, and $x+y+z=1$. The precursor compounds may have the following features in different embodiments depending on the Ni content:

- $0.33 \leq x \leq 0.35$, $2.5 \leq PD50 \leq 3.5$, $0.90 \leq PTD<1.30$ and $20<PBET<40$,
- $0.35<x \leq 0.45$, $2.5 \leq PD50 \leq 3.5$, $1.30<PTD<1.45$ and $12<PBET<20$, or
- $0.45<x \leq 0.55$, $5.0 \leq PD50 \leq 9.0$, $1.25<PTD<1.45$ and $15<PBET<25$.

In one embodiment the tapped density PTD is less than 2 $g/cm^3$. A tapped density below 0.5 $g/cm^3$ is not indicated. Given the fact that values for PBET are usually between 3 and 40 $m^2/g$, for PTD between 0.5 and 3 $g/cm^3$ and for PD50 between 2 and 20 μm it follows that an upper limit for $$\frac{PBET}{PTD * PD50}$$

can be calculated. In different embodiments of the invention, A is either one or more of the elements of the group consisting of Al, Ga, B, Ti, Mg, W, Zr, Cr and V. A dopant, also called a doping agent, is a trace impurity element that is inserted into a substance (in very low concentrations) in order to alter the electrical properties or the optical properties of the substance.

The precursor may be a hydroxide M-OH or an oxyhydroxide M-OOH compound. They may be obtained by the precipitation processes described in the prior art, by selecting such parameters as concentration of the NMC-salts in the precipitation solution versus the hydroxide compound, residence time, precipitation temperature, etc., the object of which is outside this invention. The (oxy-)hydroxide precursor are generally lithium-free, since they have to react with a lithium precursor during sintering to obtain the final lithium transition metal oxide powder.

It is clear that further product embodiments according to the invention may be provided by combining features that are covered by the different product embodiments described before.

Viewed from a second aspect, the invention can provide the use of the precursor compound described above in the manufacturing of a lithium transition metal (M)-oxide powder usable as an active positive electrode material in lithium-ion batteries.

Viewed from a third, fourth and fifth aspect, the invention can provide a lithium metal oxide powder made from the precursor compounds according to the invention, a cathode material comprising the lithium metal oxide powder, and a battery comprising that cathode material. The lithium metal oxide powder may be obtained by co-firing the precursor compounds according to the invention with a lithium precursor, such as $Li_2CO_3$, at a temperature above 800° C. in air, for at least 2 hr.

It should be mentioned here that in U.S. Pat. No. 7,585,435 a high density cobalt-manganese coprecipitated nickel hydroxide $(Ni_{(1-x-y)}Co_xMn_y)(OH)_2$ is disclosed, wherein $1/10 \leq x \leq 1/3$ and $1/20 \leq y \leq 1/3$; and wherein said particles have a tapping density of 1.5 g/cc or greater, a BET of 8-20 $m^2/g$ and a mean particle size in the range of 5-20 μm. However the tap density is determined by tapping 200 times. According to ASTM B527 a tapping frequency of 100-300 taps/min should be applied until the volume of the tapped powder does not decrease anymore. In order to measure the accuracy of the tap density measurements in U.S. Pat. No. 7,585,435 an experiment was conducted on a coprecipitated nickel-manganese-cobalt (oxy-)hydroxide with x=y=0.2, for studying the number of taps against the measured tap density. The results are given in Table 1.

TABLE 1

| tap density against number of taps for NMC 622 precursor | | | |
|---|---|---|---|
| | 200 taps | 1000 taps | 5000 taps |
| Tap density | 1.59 g/cc | 1.78 g/cc | 1.81 g/cc |

The experiment indicates that a constant tap density is reached after at least 1000 taps for the type of material in this invention. It follows that the data given in U.S. Pat. No. 7,585,435 are inaccurate.

The teaching in U.S. Pat. No. 7,585,435 is that for developing high density nickel hydroxide with a high cobalt and manganese content that exhibits a stable high utilization rate at high temperatures and low cycle deterioration, it is necessary to have a tapping density of 1.5 g/cc or greater (which in view of the above experiments should be around 2 g/cc or greater according to the measurement standard ASTM B527 used in this invention) for a powder of at least 5 μm mean particle size. U.S. Pat. No. 7,585,435 thus wants to provide particles with a large mean particle size (>5 μm) and a large tap density of ≥2 g/cc (as would be measured by ASTM B527) as the examples indicate.

In DE 10-2007-049108, also published as US 2010-310869, there is disclosed a powder compound of the formula $Ni_aM_bO_x(OH)_y$, wherein M represents Co and at least one element selected from the group consisting of Fe, Zn, Al, Sr, Mg, or Ca and mixtures thereof, or M represents Co, Mn and Fe, wherein $0.6 \leq a < 1.0$, $0 < b \leq 0.4$, $0 < x \leq 0.60$, and $1.4 \leq y < 2$, wherein the powder compound has a particle size distribution $d_{50}$ value, measured in accordance with ASTM B 822, of <5 μm, and wherein a ratio of tap density, measured in accordance with ASTM B 527, to the particle size distribution $d_{50}$ value is at least 0.4 g/cm$^3$·μm. It follows that the tap density for particles with a $d_{50}$ of 4.99 μm is at least 2 g/cm$^3$, and for particles with e.g. a $d_{50}$ of 4 μm the tap density can be smaller: at least 1.6 g/cm$^3$.

The teaching in DE10-2007-049108 is that high density nickel hydroxide cathode precursor powders with at least 60 mol % Ni need to have a mean particle size less than 5 μm and a tap density >2 g/cm$^3$ to allow obtaining high levels of volumetric energy density at a simultaneous high volumetric power density in a secondary battery. Table 2 is giving examples where the tap density is at least 2.17 g/cm$^3$. It follows that this teaching is contradictory to the teaching in U.S. Pat. No. 7,585,435, since for the only overlapping range, where the Ni content is exactly 60 mol %, the mean particle size is to be 5 μm or higher in US'435, and smaller than 5 μm in DE'108. Neither of US'435 and DE'108 suggests, as in the present invention, that a of relationship between BET, tap density and $d_{50}$, that is further dependent on the Ni content of the precursor, allows to obtain a lower irreversible capacity in the secondary battery. In that relationship, for a given BET of the precursor powder, when the mean particle size is increasing, the tap density should be decreasing, and vice versa, whereas in the cited prior art, when the mean particle size is increasing, the tap density should also increase. It is thus possible to obtain very efficient cathode powders starting from precursors having a low tap density, even lower than 2 g/cc, when the combination with Ni content, BET and $d_{50}$ is according to the invention.

DETAILED DESCRIPTION

In this invention, an upper limit for the irreversible capacity of less than 10% or even less than 8% is realized for the cathode materials made with the precursor compounds according to the invention, when cycling in a 4.3~3.0V/Li metal window range in a standard 2325-type coin cell.

Since the Ni content of the precursor is equal to the Ni content of the final lithium metal oxide cathode powder, both Ni contents may be exchanged in equations (1) and (2) above.

General Description of Experimental Data a) PBET Precursor Specific Surface Area The specific surface area is measured with the Brunauer-Emmett-Teller (BET) method using a Micromeritics Tristar 3000. 2 g of precursor powder sample is first dried in an oven at 120° C. for 2 h, followed by $N_2$ purging. Then the precursor is degassed in vacuum at 120° C. for 1 hour prior to the measurement, in order to remove adsorbed species. A higher drying temperature is not recommended in precursor BET measurements, since a precursor may oxidize at relatively high temperature, which could result in cracks or nano-sized holes, leading to an unrealistically high BET.

b) PTD Precursor Tapped Density

The tapped density (PTD) measurement of the precursor in this invention is carried out by mechanically tapping a graduated measuring cylinder (100 ml) containing the precursor sample (having a mass W, around 60-120 g). After observing the initial powder volume, the measuring cylinder is mechanically tapped for 5000 times according to ASTM B527 standard test method, so that no further volume (V in cm$^3$) or mass (W) change is observed. The PTD is calculated as PTD=W/V. The PTD measurement is carried out on an ERWEKA® instrument.

c) PD50 Precursor Particle Size

The median particle size (PD50) of the precursor compound is preferably obtained by a laser particle size distribution measurement method. In this description, the laser particle size distribution is measured using a Malvern Mastersizer 2000 with Hydro 2000MU wet dispersion accessory, after dispersing the powder in an aqueous medium. In order to improve the dispersion of the powder in the aqueous medium, sufficient ultrasonic irradiation, typically 1 minute for an ultrasonic displacement of 12, and stirring, are applied and an appropriate surfactant is introduced.

d) Cathode Material Preparation

In this invention, in order to evaluate the electrochemical behaviour in a coin cell, cathode materials have been prepared from the precursor compounds according to the invention, by using conventional high temperature sintering. $Li_2CO_3$ (Chemetall) or LiOH (SQM) is dry mixed with the precursor compound in a certain Li:M molar ratio using a Henschel Mixer® for 30 mins. The mixture is reacted at a certain temperature for 10 hours under air, using pilot-scale equipment. The Li:M molar blending ratio and sintering temperature are standard, but different for precursors with different Ni content, which will be specified in each individual example. After firing, the sintered cake is crushed, classified and sieved so as to obtain a non-agglomerated powder with a mean particle size D50 similar to that of the corresponding precursor.

e) Evaluation of Electrochemical Properties in Coin Cells

Electrodes are prepared as follows: about 27.27 wt. % of active cathode material, 1.52 wt. % polyvinylidene fluoride polymer (KF polymer L #9305, Kureha America Inc.), 1.52 wt. % conductive carbon black (Super P°, Erachem Comilog Inc.) and 69.70 wt. % N-methyl-2-pyrrolidone (NMP) (from Sigma-Aldrich) are intimately mixed by means of high speed homogenizers. The slurry is then spread in a thin layer (typically 100 micrometer thick) on an aluminum foil by a tape-casting method. After evaporating the NMP solvent at 120° C. for 3 hours, the cast film is processed through two constantly spinning rolls with a 40 micrometer gap. Electrodes are punched from the film using a circular die cutter measuring 14 mm in diameter. The electrodes are then dried overnight at 90° C. The electrodes are subsequently weighed to determine the active material loading. Typically, the electrodes contain 90 wt. % active materials with an active materials loading weight of about 17 mg (~11 mg/cm$^2$). The electrodes are then put in an argon-filled glove box and assembled within a 2325-type coin cell body. The anode is a lithium foil having a thickness of 500 micrometers (origin: Hosen); the separator is a Tonen 20MMS microporous polyethylene film. The coin cell is filled with a 1M solution of LiPF$_6$ dissolved in a mixture of ethylene carbonate and dimethyl carbonate in a 1:2 volume ratio (origin: Techno Semichem Co.).

Each cell is cycled at 25° C. using Toscat-3100 computer-controlled galvanostatic cycling stations (from Toyo) at different rate in the 4.3~3.0V/Li metal window range. The initial charge capacity CQ1 and discharge capacity DQ1 are measured in constant current mode (CC). The irreversible capacity $Q_{irr}$ is expressed in % as:

$$Q_{Irr.} = \frac{(CQ1 - DQ1)}{CQ1} \times 100 \ (\%)$$

The invention is further illustrated in the following examples:

EXAMPLE 1~6

These examples contain NMC111 precursor compounds with different particle size, different BET and different tap density as shown in Table 2. Each precursor compound is blended with Li$_2$CO$_3$ in a Li:M molar ratio of 1.10 and fired at 930° C. for 10 hours using pilot-scale equipment. The sintered cake is then crushed and classified so as to obtain a non-agglomerated powder with a mean particle size D50 similar with that of the corresponding precursor. The precursor compounds in Examples 1~3 have a $$\frac{PBET}{PTD * PD50}$$

larger than $$\frac{0.041}{(0.1566 * x) - 0.0466} (x = 0.35)$$

and the cathode materials made from these precursor compounds show a Qirr lower than 8%, which is very good. On the contrary, precursor compounds in Examples 5 and 6 have a $$\frac{PBET}{PTD * PD50}$$

smaller than $$\frac{0.041}{(0.1566 * x) - 0.0466},$$

even smaller than $$\frac{0.021}{(0.1566 * x) - 0.0466},$$

and the cathode materials made from these two precursors have a Qirr higher than 10%, which is not good. The precursor compound in Example 4 has a $$\frac{PBET}{PTD * PD50}$$

smaller than $$\frac{0.041}{(0.1566 * x) - 0.0466}$$

but larger than $$\frac{0.021}{(0.1566 * x) - 0.0466}.$$

The Qirr of the cathode material is between 8% and 10%. Conclusion: NMC111 precursor compounds with $$\frac{PBET}{PTD * PD50} > \frac{0.021}{(0.1566 * x) - 0.0466}$$

are desired, more preferably $$\frac{PBET}{PTD * PD50} > \frac{0.041}{(0.1566 * x) - 0.0466}.$$

EXAMPLE 7~13

These examples contain NMC433 precursor compounds with different particle size, different BET and different tap density as shown in Table 3. Each precursor compound is blended with Li$_2$CO$_3$ in a Li:M molar ratio of 1.08 and fired at 910° C. for 10 hours using pilot-scale equipment. The sintered cake is then crushed and classified so as to obtain a non-agglomerated powder with a mean particle size D50 similar with that of the corresponding precursor. The precursor compounds in Examples 7 and 8 have a $$\frac{PBET}{PTD * PD50}$$

larger than $$\frac{0.041}{(0.1566 * x) - 0.0466} (x = 0.38)$$

and the cathode materials made from these precursors show a Qirr lower than 8%. Precursor compounds in Examples 12 and 13 have a $$\frac{PBET}{PTD * PD50}$$

smaller than $$\frac{0.021}{(0.1566*x) - 0.0466},$$

and their corresponding cathode materials have a Qirr>10%. The precursor compounds in Examples 9~11 have a $$\frac{PBET}{PTD*PD50}$$

value between $$\frac{0.041}{(0.1566*x) - 0.0466} \text{ and } \frac{0.021}{(0.1566*x) - 0.0466}.$$

Their $Q_{irr}$'s are all between 8% and 10%. Therefore, NMC433 precursor with $$\frac{PBET}{PTD*PD50} > \frac{0.021}{(0.1566*x) - 0.0466}$$

are desired, and more preferably $$\frac{PBET}{PTD*PD50} > \frac{0.041}{(0.1566*x) - 0.0466}.$$

EXAMPLE 14~17

These examples contain NMC532 precursor compounds with different particle size, different BET and different tap density as shown in Table 4. Each precursor compound is blended with $Li_2CO_3$ in a Li:M molar ratio of 1.02 and fired at 920° C. for 10 hours using pilot-scale equipment. The sintered cake is then crushed and classified so as to obtain a non-agglomerated powder with a mean particle size D50 similar with that of the corresponding precursor. As shown in Table 4, the $$\frac{PBET}{PTD*PD50}$$

value of precursor Example 14 is larger than $$\frac{0.041}{(0.1566*x) - 0.0466}(x = 0.51),$$

which corresponds to a Qirr of its cathode materials smaller than 8%. The $$\frac{PBET}{PTD*PD50}$$

values of precursor Examples 16 and 17 are smaller than $$\frac{0.021}{(0.1566*x) - 0.0466},$$

corresponding to a Qirr of their cathode materials larger than 10%. Example 15 has a $$\frac{PBET}{PTD*PD50}$$

value between $$\frac{0.041}{(0.1566*x) - 0.0466} \text{ and } \frac{0.021}{(0.1566*x) - 0.0466}$$

and a Qirr between 8% and 10%. Therefore, NMC532 precursors with $$\frac{PBET}{PTD*PD50} > \frac{0.021}{(0.1566*x) - 0.0466}$$

are desired, more preferably $$\frac{PBET}{PTD*PD50} > \frac{0.041}{(0.1566*x) - 0.0466}.$$

EXAMPLE 18, 19

These two examples demonstrate that the present invention also applies to NMC622. The precursor compounds are well mixed with LiOH at a blend Li:M ratio of 1.02~1.04 (see Table 4). The mixture is reacted at a temperature of 880° C. for 10 hours using pilot-scale equipment. The sintered cake is then crushed and classified so as to obtain a non-agglomerated powder with a mean particle size D50 similar with that of the corresponding precursor. Example 18 shows $$\frac{PBET}{PTD*PD50}$$

value between $$\frac{0.041}{(0.1566*x) - 0.0466} \text{ and } \frac{0.021}{(0.1566*x) - 0.0466}$$

and $Q_{irr}$ between 8% and 10%. Example 19 shows $$\frac{PBET}{PTD*PD50}$$

value smaller than $$\frac{0.021}{(0.1566 * x) - 0.0466}$$

and Qirr larger than 10%. Both fit our formula very well.

All precursor compounds used in the current invention are Umicore mass-produced metal hydroxide or oxy-hydroxide. As seen in the above examples, low Ni % NMCI 11 and NMC433 precursors have a broad range of PBET, PTD at fixed PD50 while high Ni % NMC532, especially NMC622 precursors have a rather narrow range of PBET and PTD. It seems more difficult to have high PBET or low PTD precursor in high Ni NMC than in low Ni NMC. It is also normal that the higher the Ni content, the more difficult to achieve a low Qirr. Therefore, NMC622 precursor compounds satisfying $$\frac{PBET}{PTD * PD50} > \frac{0.021}{(0.1566 * x) - 0.0466}$$

are desired, more preferably $$\frac{PBET}{PTD * PD50} > \frac{0.021}{(0.1566 * x) - 0.0466}.$$

EXAMPLE 20, 21

Generally, dopants do not necessarily have a strong impact on the Qirr of the cathode material, especially when the doping amount is small. These two examples demonstrate that the present invention also applies to 1 mol % zirconium doped NMC111 and NMC433. The precursor compounds are well mixed with nano-size $ZrO_2$ (Evonik, Germany) for 10 minutes and then mixed with $Li_2CO_3$ at a blend Li:M ratio of 1.08 or 1.10 (see Table 5). The $ZrO_2$ particles are in tetragonal and monoclinic phases, and have an average primary particle size of 12 nm and a BET of $60 \pm 15$ m$^2$/g. The mixture is reacted at a temperature of 910 or 930° C. for 10 hours using pilot-scale equipment. The sintered cake is then crushed and classified so as to obtain a non-agglomerated powder with a mean particle size D50 similar with that of the corresponding precursor. Both NMC precursors satisfy with $$\frac{PBET}{PTD * PD50} > \frac{0.021}{(0.1566 * x) - 0.0466}$$

and the Qirr's of the cathodes are smaller than 8%. Therefore, for cathode materials with dopants, precursors with $$\frac{PBET}{PTD * PD50} > \frac{0.021}{(0.1566 * x) - 0.0466}$$

are desired, more preferably $$\frac{PBET}{PTD * PD50} > \frac{0.041}{(0.1566 * x) - 0.0466}.$$

TABLE 2

NMC111 precursor compounds property, firing conditions and coin cell irreversible capacity

| Examples | Precursor Ni/Mn/Co | PD50 (μm) | PBET (m²/g) | PTD (g/cm³) | Lithium source | Blend ratio | Firing T/° C. | $\frac{PBET}{PTD*PD50}$ | $\frac{0.041}{0.1566*x - 0.0466}$ | $\frac{0.021}{0.1566*x - 0.0466}$ | Coin cell Qirr |
|---|---|---|---|---|---|---|---|---|---|---|---|
| Ex1 | 35/32/33 | 3.06 | 26.25 | 1.01 | $Li_2CO_3$ | 1.10 | 930 | 8.49 | 4.99 | 2.56 | 6.5% |
| Ex2 | 35/32/33 | 3.01 | 19.85 | 1.27 | $Li_2CO_3$ | 1.10 | 930 | 5.19 | 4.99 | 2.56 | 7.7% |
| EX3 | 35/32/33 | 2.50 | 17.22 | 0.90 | $Li_2CO_3$ | 1.10 | 930 | 7.65 | 4.99 | 2.56 | 7.9% |
| EX4 | 35/32/33 | 3.30 | 20.19 | 1.32 | $Li_2CO_3$ | 1.10 | 930 | 4.63 | 4.99 | 2.56 | 9.0% |
| EX5 | 35/32/33 | 6.62 | 6.95 | 1.80 | $Li_2CO_3$ | 1.10 | 930 | 0.58 | 4.99 | 2.56 | 11.7% |
| EX6 | 35/32/33 | 10.43 | 5.42 | 2.19 | $Li_2CO_3$ | 1.10 | 930 | 0.24 | 4.99 | 2.56 | 12.2% |

TABLE 3

NMC433 precursor compounds property, firing conditions and coin cell irreversible capacity

| Examples | Precursor Ni/Mn/Co | PD50 (μm) | PBET (m²/g) | PTD (g/cm³) | Lithium source | Blend ratio | Firing T/° C. | $\frac{PBET}{PTD*PD50}$ | $\frac{0.041}{0.1566*x - 0.0466}$ | $\frac{0.021}{0.1566*x - 0.0466}$ | Coin cell Qirr |
|---|---|---|---|---|---|---|---|---|---|---|---|
| Ex7 | 38/29/33 | 3.29 | 19.34 | 1.37 | $Li_2CO_3$ | 1.08 | 910 | 4.29 | 3.18 | 1.63 | 5.9% |
| EX8 | 38/29/33 | 3.36 | 17.42 | 1.31 | $Li_2CO_3$ | 1.08 | 910 | 3.96 | 3.18 | 1.63 | 6.2% |
| EX9 | 38/29/33 | 4.92 | 12.25 | 1.32 | $Li_2CO_3$ | 1.08 | 910 | 1.89 | 3.18 | 1.63 | 8.5% |
| EX10 | 38/29/33 | 4.68 | 11.03 | 1.20 | $Li_2CO_3$ | 1.08 | 910 | 1.96 | 3.18 | 1.63 | 9.0% |
| EX11 | 38/29/33 | 4.75 | 10.55 | 0.89 | $Li_2CO_3$ | 1.08 | 910 | 2.50 | 3.18 | 1.63 | 8.8% |
| EX12 | 38/29/33 | 7.64 | 8.34 | 1.82 | $Li_2CO_3$ | 1.08 | 910 | 0.60 | 3.18 | 1.63 | 11.0% |
| EX13 | 38/29/33 | 12.53 | 4.22 | 2.31 | $Li_2CO_3$ | 1.08 | 910 | 0.15 | 3.18 | 1.63 | 12.1% |

TABLE 4

NMC532 and NMC622 precursor compounds property, firing conditions and coin cell irreversible capacity

| Examples | Precursor Ni/Mn/Co | PD50 (μm) | PBET (m²/g) | PTD (g/cm³) | Lithium source | Blend ratio | Firing T/° C. | $\frac{PBET}{PTD*PD50}$ | $\frac{0.041}{0.1566*x - 0.0466}$ | $\frac{0.021}{0.1566*x - 0.0466}$ | Coin cell Qirr |
|---|---|---|---|---|---|---|---|---|---|---|---|
| Ex14 | 51/29/20 | 7.46 | 15.97 | 1.31 | Li₂CO₃ | 1.02 | 920 | 1.63 | 1.23 | 0.63 | 6.7% |
| EX15 | 51/29/20 | 6.56 | 10.45 | 1.73 | Li₂CO₃ | 1.02 | 920 | 0.92 | 1.23 | 0.63 | 9.4% |
| EX16 | 51/29/20 | 12.97 | 4.47 | 2.39 | Li₂CO₃ | 1.02 | 920 | 0.14 | 1.23 | 0.63 | 12.1% |
| EX17 | 51/29/20 | 10.63 | 4.70 | 2.29 | Li₂CO₃ | 1.02 | 920 | 0.19 | 1.23 | 0.63 | 11.0% |
| EX18 | 60/20/20 | 4.55 | 5.66 | 1.99 | LiOH | 1.04 | 880 | 0.63 | 0.87 | 0.44 | 9.7% |
| EX19 | 60/20/20 | 12.77 | 4.54 | 2.42 | LiOH | 1.02 | 880 | 0.15 | 0.87 | 0.44 | 10.7% |

TABLE 5 precursor compounds property, firing conditions and coin cell irreversible capacity for Zr doped NMC111 and NMC433

| Examples | Precursor Ni/Mn/Co | PD50 (μm) | PBET (m²/g) | PTD (g/cm³) | Lithium source | Blend ratio | Firing T/° C. | $\frac{PBET}{PTD*PD50}$ | $\frac{0.041}{0.1566*x - 0.0466}$ | $\frac{0.021}{0.1566*x - 0.0466}$ | Coin cell Qirr |
|---|---|---|---|---|---|---|---|---|---|---|---|
| Ex20 | 35/32/33 | 3.20 | 21.10 | 1.23 | Li₂CO₃ | 1.10 | 920 | 5.36 | 4.99 | 2.56 | 7.3% |
| EX21 | 38/29/33 | 3.33 | 14.01 | 1.28 | Li₂CO₃ | 1.08 | 920 | 3.29 | 3.18 | 1.63 | 7.9% |

The invention claimed is:

1. A particulate precursor compound for manufacturing a lithium transition metal (M)-oxide powder usable as an active positive electrode material in lithium-ion batteries, wherein (M) is $Ni_xMn_yCo_zA_v$, A being a dopant, wherein $0.33 \leq x \leq 0.60$, $0.20 \leq y \leq 0.33$, and $0.20 \leq z \leq 0.33$, $v \leq 0.05$, and $x+y+z+v=1$, the precursor having a specific surface area PBET in m²/g, a tapped density PTD in g/cm³, a median particle size PD50 in μm, and
wherein $$\frac{PBET}{PTD*PD50} \geq \frac{0.021}{(0.1566*x) - 0.0466},$$

wherein:
for $0.33 \leq x \leq 0.35$, the median particle size PD50, the tapped density PTD, and the median particle size are: $2.5 \leq PD50 \leq 3.5$, $0.90 \leq PTD < 1.30$ and $20 < PBET < 40$; or
for $0.35 < x \leq 0.45$, PD50, PDT, and PBET are: $2.5 \leq PD50 \leq 3.5$, $1.30 < PTD < 1.45$ and $12 < PBET < 20$; or
for $0.45 < x \leq 0.55$, PD50, PDT, and PBET are: $5.0 \leq PD50 \leq 9.0$, $1.25 < PTD < 1.45$ and $15 < PBET < 25$.

2. The precursor compound of claim 1, wherein $$\frac{PBET}{PTD*PD50} \geq \frac{0.041}{(0.1566*x) - 0.0466}.$$

3. The precursor compound of claim 1, wherein v=0, the compound having a PTD<2 g/cm³.

4. The precursor compound of claim 1, wherein the precursor is a hydroxide M-OH or an oxyhydroxide M-OOH compound.

* * * * *